Feb. 9, 1943. C. C. CALLIS 2,310,200
MANGER
Filed Oct. 25, 1940
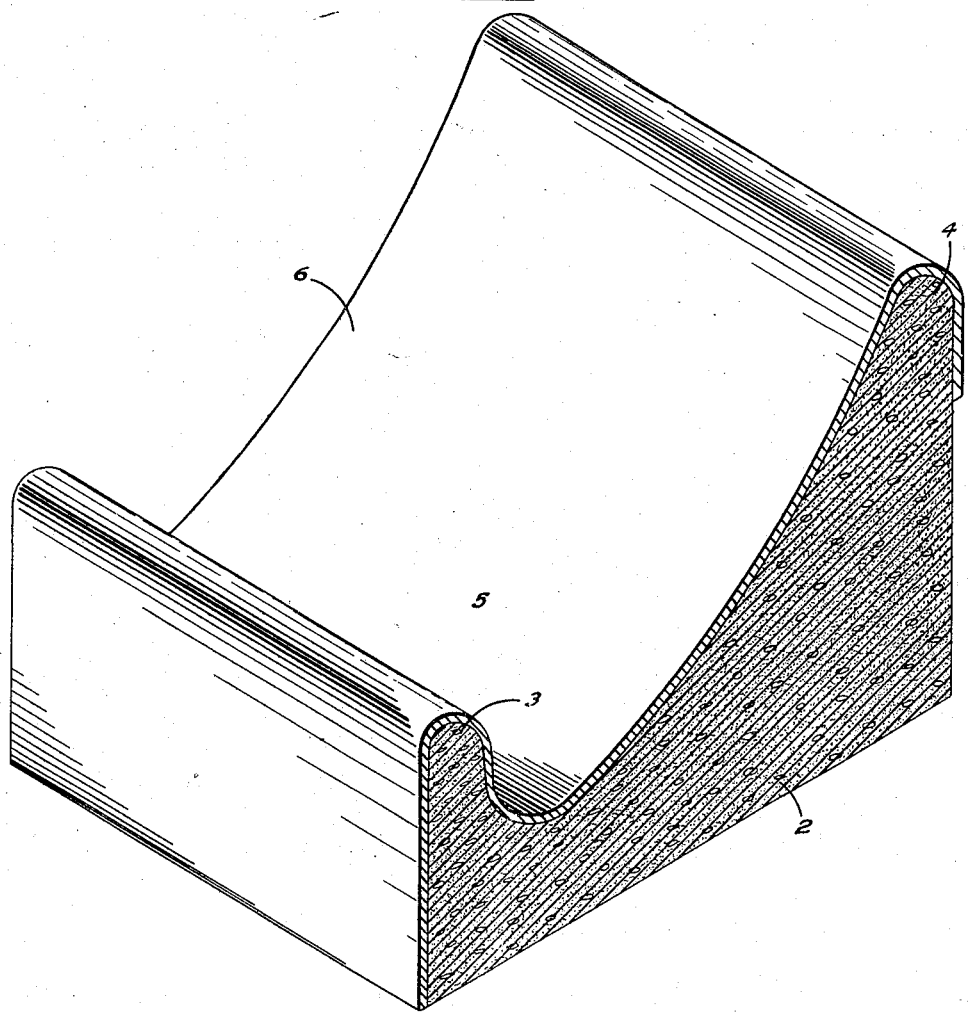

Patented Feb. 9, 1943

2,310,200

UNITED STATES PATENT OFFICE 2,310,200

MANGER

Conral C. Callis, Smoketown, Pa., assignor to Armstrong Cork Company, Lancaster, Pa., a corporation of Pennsylvania Application October 25, 1940, Serial No. 362,703

12 Claims. (Cl. 119—61)

This invention relates to mangers and, more particularly, to preformed sheet facings for mangers which are durable, acid-resistant, and decorative so as to enhance the appearance of the manger.

One of the basic problems present in the dairy industry is that of maintaining the mangers or feed gutters and troughs in sanitary condition. Mangers are commonly constructed of concrete cast in the form desired since it is relatively inexpensive in initial cost and can be easily and quickly cast even by unskilled labor. Unfortunately, concrete is extremely porous and is quickly attacked by the acidic juices found in ensilage so that its surface becomes pitted and extremely porous within a relatively short time. Such pits, pores, and openings afford ideal conditions for harmful bacteria growth and accordingly mangers so constructed have a relatively short period of useful service. It will be appreciated while the original manger cost is relatively low, frequent replacement necessitated by its susceptibility to acidic juices found in the ensilage renders mangers so constructed quite expensive. Another disadvantage of concrete mangers resides in the roughness and irregularities of the lip and forepart of the manger which causes abrasion of the skin of the animal when the animal rubs thereagainst while reaching for ensilage. This is quite serious since the abrasions may become infected and cause ill-health or even the death of the animal.

Various attempts have been made to eliminate frequent replacement so as to prolong the life of the manger but no means heretofore provided to my knowledge can be considered successful. It has been proposed to patch or fill the pits and openings with various cements and filler compositions and while such patching has prolonged the life of the manger to some slight extent, it has generally been deemed undesirable since the patching materials used do not bind readily or to any great extent with the concrete; the openings or pits may be quite small and difficult to fill satisfactorily; such openings or pits need be cleaned before patching, which is difficult, arduous, and consumes a relatively large amount of time; generally "patching" does not prolong the life of the manger to a sufficient extent to warrant the expense involved. Accordingly, the mangers commonly are razed and replaced by new concrete constructions.

The chief object of my invention is to provide a manger which does not require frequent replacement. An object of my invention is to provide a facing for mangers which obviates the frequent replacement of the manger. A further object is to provide a preformed facing for mangers which is decorative, durable and acid resistant, which can be readily and quickly applied and shaped to the configuration of the manger, and which can be readily and quickly removed when desired to permit a new facing to be applied to the manger. A still further object is to provide a facing for mangers which can be manufactured in sheet form and which can be readily shaped to conform to the configuration of the manger. A still further object is to provide a facing for mangers which can be adhesively bonded thereto and which will remain satisfactorily in predetermined position on the manger so as to obviate any possibility of the acidic juices found in the ensilage attacking the concrete manger foundation. A still further object is to provide a facing for mangers which possesses a hard, dense, substantially non-porous, non-abrasive smooth surface and which is inexpensive and economical in manufacture.

The figure is a perspective view of a portion of the manger.

This invention relates to a manger facing which is durable, decorative, and acid resistant, consisting of a sheet of facing material composed of a skeleton formed of interlaced, entangled fibers held in fixed position in a thermoplastic matrix. Preferably, the fibers of the facing carry or are saturated with a moisture and acid resistant substance compatible with the thermoplastic matrix. The thermoplastic matrix is composed of a high melting point natural asphalt blended with a second asphalt having a lower melting point. It is essential that the thermoplastic matrix, which acts as a binder for the interlaced, entangled fibers, be compatible with the saturant of the fibers in order to ensure a satisfactory facing material being produced. Preferably, a blend of such asphalts is used since, if a high melting point asphalt were used alone, the composition would be brittle, susceptible to breaking or cracking, and could not readily be shaped to conform to the configuration of the manger; if a lower melting point asphalt were used alone, the facing would be soft, tacky, and susceptible to abrasion and indentation so that pits or openings would readily form therein. The asphalts may be blended together in various proportions, of course, depending upon the specific properties it is desired to emphasize in the finished facing, but I have found substantially equal proportions of both asphalts permit a facing to be obtained which possesses the requisite properties for use as a covering for mangers.

Specifically stated, the facing may comprise the following ingredients in substantially the following proportions:

|  | Pounds |
|---|---|
| Petroleum asphalt | 43 |
| Gilsonite | 43 |
| Fibrous material | 122 |
| Fly ash | 88 |
| Pigment | 3 |

These materials are placed in a mixer and blended at a temperature within a range of 290°–310° F. for approximately twenty-five minutes. The materials are mixed or blended together until the batch shows no indications of unmixed material or uneven distribution of pigments. The fibrous material, preferably, is saturated in any desired manner with any suitable saturant compatible with the binder prior to the mixing operation. The fibrous material is more thoroughly permeated by the binder than would be the case if reliance were placed solely upon the mixing operation with the binder to impart acid and moisture resistance to the fibers and, hence, a great degree of acid and moisture resistance is obtained in the finished product. The fibers are broken down in the mixing operation and are entangled or interlaced by such mixing, forming a skeleton or frame which serves to carry the particles of fly ash, the whole being suspended or held in fixed position in a thermoplastic matrix formed by the asphaltic binder.

After mixing, the composition is conveyed to a two roll mixing mill or rubber mill and is passed between the rolls thereof. The material is permitted to make several revolutions about the roll to aid in mixing and is then doctored off in the form of rough sheets. The sheets are folded and passed through a sheeting calender to compact and compress the sheets to final form and to render the surface thereof dense and smooth and free from pores or pits. If desired, the sheet may be again passed through the sheeting calender to ensure a dense smooth surface.

In the above composition, gilsonite and petroleum asphalt are used as a binder; if desired, any other high melting point asphalt may be used in place of gilsonite while any low penetration petroleum asphalt having a melting point substantially lower than the natural asphalt may be used. The fibrous material may be composed of cotton or wood fiber, paper fibers, or even waste fibrous material such as felt base scrap from the floor covering industry. Preferably, as pointed out above, the fibrous material is saturated or impregnated by a moisture resistant material, such as a low melting point asphalt, which readily penetrates the fibers and is compatible with the binder. The fly ash is used primarily as a filler to increase the density of the composition; if desired, I may substitute anthracite ash, ground limestone, ground linoleum scrap, or cork particles in extremely small sizes such as 100 mesh to dust. The pigment used is preferably carbon black; if desired, other suitable pigments may be substituted therefor to impart a required color to the composition.

In application, the concrete manger foundation may be treated with a suitable prime coating of asphalt or the like to fill the pores thereof, and an adhesive coating placed thereon; the sheet of facing material is then placed thereon and conformed to the configuration of the manger, being securely held in proper position by the adhesive. Any suitable adhesive may be used, of course, but I have found asphaltic adhesives or cements are satisfactory for this purpose. It may be found in some instances that the facing material may not be readily bent about the lip or curved surfaces of the manger without pretreatment. In such cases, the facing may be suitably heated to soften it and conformed to the configuration of the manger while in softened condition. This is probably the preferred procedure since it eliminates breaking or cracking of the facing such as might occur when installation is carried on by inexperienced or unskilled workmen.

While I have described my invention with particular application to the type of mangers commonly in use in the dairy industry, it will be understood prefabricated metal mangers may be manufactured in a factory, provided with the facing of my invention, and furnished for erection in a barn. It is to be understood such prefabricated types of mangers are within the purview of my invention. The facings, if desired, may be shaped at a factory to conform to predetermined sizes of mangers and so furnished to the user.

The attached drawing is an isometric view of a portion of a manger provided with the durable, non-abrasive, acid and moisture resistant facing of my invention. There is illustrated a concrete foundation 2 having front and rear lips 3 and 4 forming an ensilage channel 5 for the reception of ensilage. A facing 6, formed as above described, is disposed in the channel 5 and extends over the front and rear lips 3 and 4 and the forepart of the foundation 2. The facing 6 may be adhesively secured to the foundation. By extending the facing 6 over the front lip 3 and the forepart of the manger the possibility of injury to the skin of the user caused by rubbing contact with the rough foundation is obviated. The facing 6 may cover completely the forepart of the manger for decorative purposes or may extend thereover only for a distance sufficient to obviate any possibility of abrasion. The covering may likewise extend over the rear lip 4 and for some distance along the rear surface of the foundation. It will be understood, of course, the concrete manger foundation may be cast in any desired form since my invention is not limited to the precise form illustrated.

My invention obviates the necessity of frequent manger replacements and prolongs the life of a manger many times over that heretofore believed possible. It provides a readily applied, smooth, dense facing which is durable, decorative, acid and moisture resistant and which may be easily removed when worn to permit a new facing to be disposed on the manger. The facing is smooth and non-abrasive so as to eliminate any possiblity of abrasion of the skin of the animal. It may be readily conformed to the specific configuration of a manger and adheres thereto to obviate any possibility of the acidic juices of ensilage attacking the manger foundation.

While I have described and illustrated a preferred embodiment of my invention, it will be understood my invention is not limited thereto since it may be otherwise embodied within the scope of the following claims.

I claim:

1. A manger comprising a foundation and a preformed facing bonded thereto, said facing comprising a skeleton formed of interlaced entangled fibers saturated with a moisture resistant substance, the skeleton being held in fixed position in a thermoplastic matrix compatible with said moisture resistant substance.

2. A manger according to claim 1, in which the matrix is composed of a high melting point natural asphalt blended with a second asphalt having a lower melting point.

3. A manger comprising a concrete foundation, and a preformed facing bonded in predetermined position to said foundation, said facing comprising saturated fibrous material, and a thermoplastic binder compatible with the saturant of the fibrous material.

4. A manger comprising a concrete foundation, a preformed facing disposed thereon, and a layer of adhesive bonding the facing to the foundation, said facing comprising fibrous material, fly ash and a thermoplastic binder, said binder including a high melting point asphalt blended with a second asphalt having a lower melting point.

5. A preformed, durable, acid and moisture resistant facing for mangers comprising a skeleton formed of interlaced, entangled fibers held in fixed position in a thermoplastic matrix.

6. A preformed, durable, acid and moisture resistant facing according to claim 5, in which the matrix is composed of equal proportions of a high melting point natural asphalt and a second asphalt having a lower melting point.

7. A preformed, durable, acid and moisture resistant facing for mangers comprising saturated fibrous material and a thermoplastic binder compatible with the saturant of the fibrous material.

8. A preformed, durable, acid and moisture resistant facing for mangers comprising the following ingredients in substantially the following proportions:

| | Pounds |
|---|---|
| Petroleum asphalt | 43 |
| Gilsonite | 43 |
| Saturated fibrous material | 122 |
| Fly ash | 88 |
| Pigment | 3 |

9. A manger comprising a concrete foundation having front and rear lips forming an ensilage channel, and a smooth, dense, non-abrasive facing disposed in the ensilage channel and extending over at least the front lip and the forepart of the foundation thereby obviating abrasion to the skin of the user occasioned by rubbing contact with the foundation.

10. A manger comprising a concrete foundation having front and rear lips forming an ensilage channel, and a preformed, nonabrasive facing disposed in the ensilage channel and extending over at least the front lip and the forepart of the foundation thereby obviating abrasion to the skin of the user occasioned by rubbing contact with the foundation, said facing comprising interlaced entangled fibers and a thermoplastic binder securing the fibers to one another.

11. A manger comprising a foundation, and a preformed facing bonded thereto, said facing including interlaced, entangled fibers held together by a thermoplastic binder.

12. A manger comprising a foundation, and a preformed, acid and moisture-resistant facing disposed in predetermined position on said foundation, said facing including interlaced, entangled fibers held together by a thermoplastic binder.

CONRAL C. CALLIS.